United States Patent
Rodzevski et al.

(10) Patent No.: US 12,509,206 B2
(45) Date of Patent: Dec. 30, 2025

(54) POWERED WATERCRAFT AND A METHOD FOR ADJUSTING A POWERED WATERCRAFT

(71) Applicant: Ride Awake ApS, Copenhagen (DK)

(72) Inventors: Aleksandar Rodzevski, Malmö (SE); Dimitrios Triantafillidis, Limhamm (SE); Martin Pråme Malmqvist, Svedala (SE); Philip Sveningsson, Höllviken (SE)

(73) Assignee: Ride Awake ApS, Copenhagen (DK)

( * ) Notice: Subject to any disclaimer, the term of this patent is extended or adjusted under 35 U.S.C. 154(b) by 62 days.

(21) Appl. No.: 18/713,977

(22) PCT Filed: Nov. 28, 2022

(86) PCT No.: PCT/EP2022/083531
§ 371 (c)(1),
(2) Date: May 28, 2024

(87) PCT Pub. No.: WO2023/094668
PCT Pub. Date: Jun. 1, 2023

(65) Prior Publication Data
US 2025/0033754 A1    Jan. 30, 2025

(30) Foreign Application Priority Data
Nov. 29, 2021 (SE) .................... 2151455-9

(51) Int. Cl.
*B63B 32/10* (2020.01)
*B60L 15/20* (2006.01)
(Continued)

(52) U.S. Cl.
CPC .............. *B63H 21/21* (2013.01); *B60L 15/20* (2013.01); *B63B 32/10* (2020.02); *B63B 79/40* (2020.01);
(Continued)

(58) Field of Classification Search
CPC .. B63H 21/21; B63H 21/17; B63H 2021/216; B60L 15/20; B60L 2200/32;
(Continued)

(56) References Cited

U.S. PATENT DOCUMENTS 6,757,606 B1   6/2004 Gonring
8,798,825 B1   8/2014 Hartman
(Continued)

FOREIGN PATENT DOCUMENTS

| EP | 3691078 A1 | 8/2020 |
| WO | 2016061274 A1 | 4/2016 |
| WO | 2020225076 A1 | 11/2020 |

*Primary Examiner* — Ramya P Burgess
*Assistant Examiner* — Chanmin Park
(74) *Attorney, Agent, or Firm* — Capitol City TechLaw

(57) ABSTRACT

The disclosure relates to a powered watercraft (100) comprising: a host device (102), the host device comprising at least one host identifier device (104), a driveline (106) comprising a propulsion module (108) and a battery module (110), the battery module being configured to power the propulsion module, the driveline comprising an identifying device (112) and a control unit (114), the control unit being configured to adjust at least one driveline parameter, wherein the driveline is configured to be received in the host device, wherein the identifying device is configured to read the at least one host identifier device to obtain at least one host identifier of the host device, wherein the control unit is configured to receive the at least one host device identifier from the identifying device, to obtain at least one corresponding host device characteristic based on the host device identifier; and to adjust the at least one driveline parameter based on the at least one corresponding host device characteristic. The disclosure further relates to a method for adjusting a powered watercraft.

12 Claims, 6 Drawing Sheets

(51) Int. Cl.
*B63B 79/40* (2020.01)
*B63H 21/17* (2006.01)
*B63H 21/21* (2006.01)

(52) U.S. Cl.
CPC .......... *B63H 21/17* (2013.01); *B60L 2200/32* (2013.01); *B60L 2240/421* (2013.01); *B60L 2240/429* (2013.01); *B60L 2250/16* (2013.01); *B63B 2213/02* (2013.01); *B63H 2021/216* (2013.01)

(58) Field of Classification Search
CPC ......... B60L 2240/421; B60L 2240/429; B60L 2250/16; B63B 32/10; B63B 79/40; B63B 2213/02; B63B 32/53; B63B 32/60
See application file for complete search history.

(56) References Cited

U.S. PATENT DOCUMENTS

| | | |
|---|---|---|
| 2012/0191276 A1 | 7/2012 | Clever et al. |
| 2018/0170502 A1 | 6/2018 | Terada |
| 2019/0067751 A1 | 2/2019 | Funk et al. |
| 2019/0344862 A1 | 11/2019 | Tian |
| 2021/0070413 A1 | 3/2021 | Gulliksson et al. |
| 2023/0161308 A1* | 5/2023 | Nordstrom .............. F03D 13/25 700/287 |

\* cited by examiner

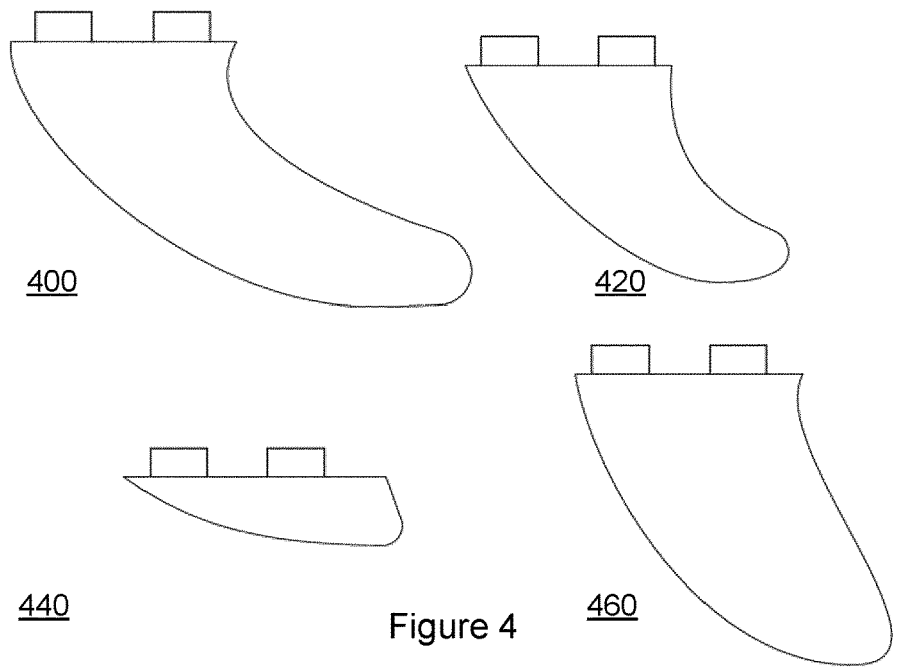
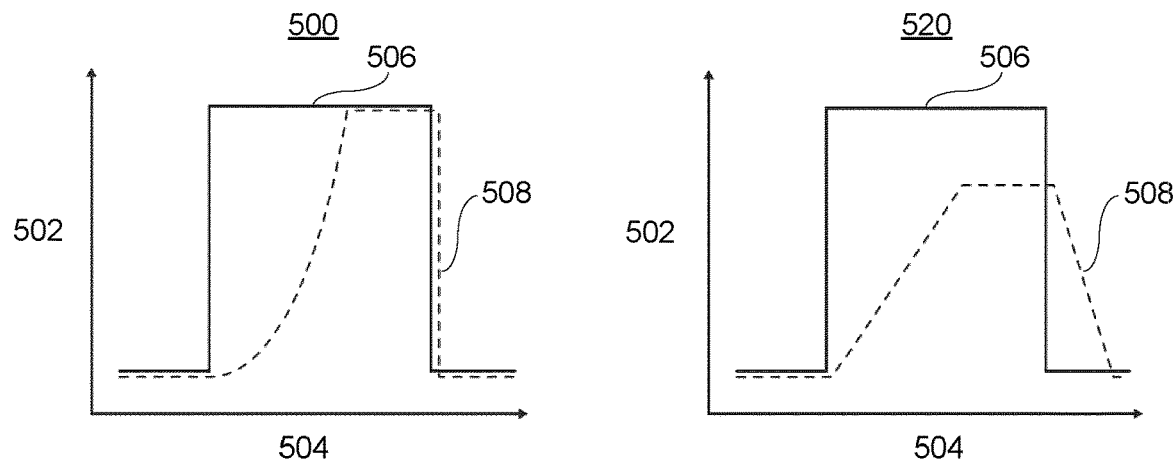
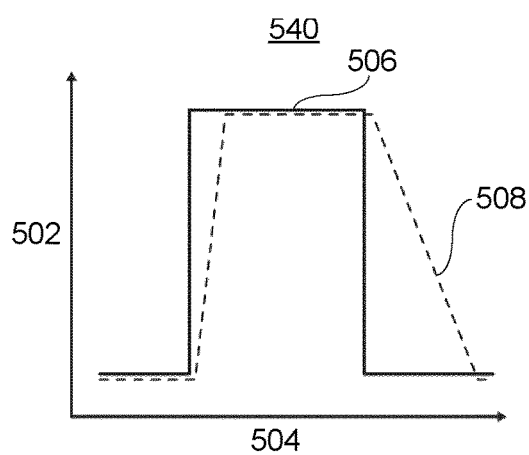
Figure 4
Figure 5a
Figure 5b
Figure 5c

700

702 - Reading, by the identifying device, the at least one host identifier device to obtain a host identifier of the host device 704 - Receiving, in the control unit, the host identifier from the identifying device 706 - Obtaining, in the control unit, at least one corresponding host device characteristic based on the host identifier 708 - Adjusting the at least one driveline parameter based on the at least one corresponding host device characteristic

Figure 7

POWERED WATERCRAFT AND A METHOD FOR ADJUSTING A POWERED WATERCRAFT

This application claims priority under 35 USC 119(a)-(d) to SE patent application No. 2151455-9, which was filed on Nov. 29, 2021, the entire contents of which are incorporated herein by reference.

TECHNICAL FIELD

The present disclosure relates to a powered watercraft and a method for adjusting a powered watercraft. More specifically, the disclosure relates to a powered watercraft comprising a host device and a driveline.

BACKGROUND ART

Powered watercraft have different physical properties and are used in different contexts, affecting the optimal settings for propulsion and batteries of the powered watercraft. Typically, such settings may be embedded into the power system of a watercraft. However, current power systems are not adapted to change where the physical properties of the powered watercraft change.

SUMMARY

It is an object of the present disclosure to mitigate, alleviate or eliminate one or more of the above-identified deficiencies and disadvantages in the prior art and solve at least the above mentioned problem. According to a first aspect there is provided a powered watercraft of a first aspect comprising a host device, the host device comprising at least one host identifier device, a driveline comprising a propulsion module and a battery module, the battery module being configured to power the propulsion module, the driveline comprising an identifying device and a control unit, the control unit being configured to adjust at least one driveline parameter. The driveline is configured to be received in the host device. The identifying device is configured to read, or in any other way detect, the at least one host identifier device to obtain at least one host identifier of the host device. The control unit is configured to receive the at least one host device identifier from the identifying device, to obtain at least one corresponding host device characteristic based on the host device identifier; and to adjust the at least one driveline parameter based on the at least one corresponding host device characteristic.

In a powered watercraft, such as an electrically-powered jetboard, comprising a host device and a removable driveline, it is advantageous for the driveline to be adaptable to the host device. By identifying the host device through a host identifier device such as an RFID tag, the powered watercraft may automate the detection of the host device and adjust driveline parameters accordingly.

In an embodiment, the powered watercraft may be a battery powered watercraft such as an electrically powered, water jet propelled surfboard, i.e. a jetboard, comprising a host device and a driveline.

In some embodiments, the host device is a flotation device configured to receive a removable driveline. The host device may be hull or a main body, such as a substantially rigid main body, for a powered watercraft, such as an electrical water-jet propelled surfboard.

The host device may be understood as a structural part of a watercraft providing an amount of buoyancy, and preferably a load-bearing capacity, for carrying a user. The host device may be a surfboard blank, such as a piece of lightweight material provided in a shape roughly resembling a surfboard and may for example be made from an expanded polyurethane and/or polystyrene (EPS) foam, optionally with the foam being laminated with wood or composite stringers for added structural rigidity. The host device may further comprise a shell, where the shell may be made of, for example, resin and/or a high impact polymer such as ABS. Alternatively or additionally, the host device may form part of a hull or substantially rigid main body made from wood, metal or composite materials.

In some embodiments, the host device is configured to receive a driveline comprising a battery module and a propulsion module. The battery module and the propulsion module may be electrically interconnected. In some embodiments, the host device may be configured to receive the driveline by a cavity, wherein the host device cavity has a geometrical shape that defines an internal volume so that the driveline may be received in said cavity. The driveline may be substantially flush with the exterior surface of the host device.

In an embodiment, the host device may be configured to receive a driveline comprising a battery module and a propulsion module provided within two compartments accessible from an exterior surface of the host device. In some embodiments, a battery compartment may be within an upper surface of the host device, so that a battery module can be removably mounted in said battery compartment and at least partially held in place under gravity. In some embodiments, a propulsion module compartment may be within a lower surface or a rear surface of the host device, so that at least a water inlet or duct portion of a propulsion module is below the waterline of the host device when floating in a body of water. Thus, the host device may provide two adjacent compartments for receiving a battery module and a propulsion module, e.g. an upper compartment for the battery module and a propulsion module compartment below the waterline. The upper compartment and the compartment below the waterline may have a connection, so that the battery module and the propulsion module may be interconnected when installed in the host device.

Examples of the host device include but are not limited to: a surfboard such as a jetboard, a small boat, or a jet ski.

In some embodiments, the driveline comprises a propulsion module and a battery module. The propulsion module may be configured to propel the watercraft, for example, through water jets. The battery module is configured to provide power to the propulsion module.

In an embodiment, the powered watercraft may have a driveline comprising a wholly replaceable water-jet propulsion module powered by a replaceable battery module arranged within a battery compartment of the host device and detachably connected to said propulsion module. The battery module and propulsion module may be removable.

The propulsion module, such as a jet drive, for a powered watercraft, such as an electrical jetboard, may comprise an electrical motor, such as an electrical motor provided in a water-tight or substantially water-tight housing. The propulsion module may comprise a water inlet and a water outlet, such as a jet nozzle, being in fluid communication with said water inlet. The propulsion module may comprise an electrical motor, a motor controller, such as a pulse-width modulation (PWM) motor controller, and an impeller configured to act upon a fluid when driven by the electrical motor. An impeller for use in a water-jet is generally provided on a rotary hub to allow the impellers to spin, so that water acted upon by the impeller is accelerated to produce a water jet. The propulsion module may comprise an inlet duct configured to draw in water from a body of water into a tubular channel by the impeller being rotated via a shaft placed substantially concentrically with said tubular channel, thus providing thrust in a longitudinal direction by expelling water out through a nozzle. The propulsion module may comprise a fixed nozzle.

The battery module may comprise a battery management system (BMS) configured to provide power conversion and battery cell conditioning to rechargeable battery cells in the battery module. A pair of power terminals are typically provided at an exterior surface of the battery module to enable recharging of its rechargeable battery cells and/or delivery of electrical power from said rechargeable battery cells to a load, such as an electrical motor, the propulsion module or the like. In this way, the battery module may provide a contacting portion configured to engage with a compatible contacting portion of an external battery charger and/or an electrical device configured to receive electrical power from said battery module, such as a compatible contacting portion provided at the propulsion module.

In some embodiments, the battery module comprises a housing, one or more rechargeable battery cells connected to an electrical circuit and a contacting portion having a plurality of electrical contacts connected to said electrical circuit, wherein the electrical contacts are provided at an exterior surface of said housing.

In some embodiments, the propulsion module comprises an electrically driven water-jet configured to propel the powered watercraft. The propulsion module may be provided with electrical power from the battery module, e.g. by the propulsion module having a contacting portion with a plurality of electrical contacts configured to be electrically connected to a plurality of electrical contacts provided at a compatible contacting portion of the battery module. In this way, a direct current (DC) electrical output from the battery module may be provided to the electrical motor of the propulsion module, which may for example be a brushless DC motor or an induction motor powered by alternating current (AC) via a DC-to-AC converter.

The driveline including the battery module, and/or the propulsion module may further comprise a housing, where the housing is water-tight or substantially water-tight and encloses one or more rechargeable battery cells and/or the electrical circuit. The housing may be made of any suitable material, including a hard plastic material, such as acrylonitrile butadiene styrene (ABS), or a suitable thermoplastic polymer.

The driveline including the battery module, and/or the propulsion module further comprises a control unit. The control unit is configured to receive identifiers from identifying devices, to obtain device characteristic based on identifiers; and to adjust driveline parameters. The control unit may include a processor, and may further comprise the battery management system. In some embodiments, the control unit is provided in the battery module. In some embodiments, the control unit is provided in the propulsion module. In some embodiments, the control unit may be distributed between the propulsion module and the battery module. In some embodiments the control unit is provided outside of the battery module and the propulsion module, however, electrically interconnected with the battery module and the propulsion module.

The driveline including the battery module, and/or the propulsion module further comprises at least one identifying device. In some embodiments, there may be more than one identifying device, for example, to allow identification by different means and/or in different locations.

The same driveline may be used with different host devices. In some examples, a same driveline may be used for a number of different host devices having different characteristics, while being configured for receiving the same driveline. In some examples, the different host devices have same compartment(s) for receiving the driveline. In some examples, the different characteristic may include a size of the host device, the different characteristic may include a different outer shape of the host device. In some examples, the optimal settings of the driveline might change depending on the host device characteristics.

In some examples, the host device is a surfboard, and a same driveline may be provided in both a smaller surfboard, a medium size jetboard and a larger jetboard, and the optimal settings of the driveline might change. For example, to maintain the same speed, e.g. a larger jetboard could require more power than a smaller one, and the power requirements for the driveline would thus be different.

For a driveline to adapt to a host device, the host device should be identified. In accordance with the present disclosure, the host device comprises a host device identifier. The host device identifier may either identify a characteristic of the host device, such as a model, or the individual host device itself. The identifying device is configured to read the identifier device of the host device, and thereby obtain the host identifier, and pass the host identifier to the control unit. The control unit, based on the host identifier, is configured to adjust the driveline parameters accordingly.

An advantage is that the same driveline may be used across different host devices and in different contexts. For example, the driveline may be used in both a high-performance watercraft and an all-round watercraft, the driveline may be used in a watercraft configured to be slow-paced, and the driveline may be used in a watercraft configured to move at a high speed. In some examples, the watercraft is a jetboard, and the jetboard may be a high-performance jetboard or an all-round jetboard. A further advantage is that the watercraft, including host device, is automatically identified. Hereby, predetermined settings being optimized for the particular host device for a particular watercraft may be applied. A further advantage is that a user of the watercraft does not need to make manual adjustments nor have prior knowledge of the settings required to optimize use of the powered watercraft.

Optimization may mean adjusting different parameters according to the context, and may be, for example, optimizing a powered watercraft to achieve better performance or to improve battery life. It should be noted that in case of a land craft instead of a watercraft, the host device of the land craft may accordingly comprise a host device identifier, thereby the host device of the land craft may accordingly be automatically identified. The control unit of the land craft, based on the host identifier, may be configured to adjust the driveline parameters accordingly. In some embodiments, the host device identifier may indicate whether the drive module is inserted in a watercraft or a land craft. Examples of the land craft may be a motorcycle, golf cart, gokart, etc. In some embodiments, the host device identifier comprises or includes an identifier indicating whether the host device is a land vehicle or a watercraft.

According to some embodiments, the at least one host device characteristic comprises one or more of the following: a watercraft type, a shape characteristic, a size characteristic, a material characteristic.

In some embodiments, a watercraft type may have a number of available host devices, such as a number of host device types. In some embodiments, host devices have different characteristics affecting the behavior of the watercraft, both the behavior in the water, as well as the response of host device to input power. In some embodiments, optimization includes optimization of driveline parameters, such as optimization of driveline parameters based on host device characteristics. In some embodiments, a host device characteristic may be the watercraft type of the host device, for example, the watercraft type may include a surfboard, jetboard, jet ski, or a small leisure boat. Further examples of the type of watercraft include efoil, waverunner, dingy, and kayak.

In some embodiments, the obtained at least one corresponding host device characteristic based on the host device identifier enables determination of the type of the watercraft in which the driveline is received. Driveline parameters such as thrust, RPM, and top speed, etc., may be adjusted to optimally suit the watercraft type identified via the host device characteristic accordingly.

A host device characteristic may be a shape characteristic, such as a shape characteristic that affects its optimal usage. A shape characteristic may be associated with a particular model of a host device, for example associated with a high-performance host device or an all-round host device. A shape characteristic may include for example, a round-bottomed hull, a flat-bottomed hull, a curved hull, or a v-shaped hull. A shape characteristic may include different levels of hull buoyancies. A flat-bottomed hull may be, for example, result in a more buoyant, but less agile host device. Where the host device is less agile, a driveline parameter such as the throttle curve may be adjusted for smoother acceleration. A curved hull may result in a less buoyant, but more agile host device. Where the host device is more agile, a driveline parameter such as the throttle curve may be adjusted for faster acceleration. A curved hull may be associated with a high-performance host device, where a driveline parameter such as allocated battery capacity may be increased to allow increased performance.

In some embodiments, the obtained at least one corresponding host device characteristic based on the host device identifier enables determination of the shape characteristic of the watercraft based on the host device characteristic. Driveline parameters such as thrust, RPM, and top speed, etc., may be adjusted to optimally suit the shape characteristic such as for example suit or be optimized for the shape of the hull. In some embodiments, the shape characteristic of the host device characteristic allows for automatically adjusting the driveline parameters such as thrust, RPM, and top speed, etc., to account for different levels of hull buoyancies.

In some embodiments, driveline parameters may include propulsion parameters, such as thrust, RPM, top speed, etc.

A host device characteristic may be a size characteristic, such as length, breadth, volume, or weight, which may affect the performance of the host device and thus the optimization of the driveline parameters.

In some examples, a size characteristic may be length, where a host device behaves differently in dependence on the length of the host device. For example, a host device with a length of 180 cm may behave differently than a host device with a length of 200 cm. Another size characteristic may be weight, where a host device of 9 kg may behave differently from a host device of 15 kg. In some embodiments, the size characteristic may include a range, e.g. for length, 160 cm to 190 cm, 180 cm to 220 cm; for weight, 7-12 kg, 12-18 kg.

For example, where the host device characteristic is weight, a driveline parameter such as allocated battery capacity may be reduced for a host device of lower weight to limit the powered watercraft to a safe maximum speed.

The combination of size characteristics with other host characteristics may affect the performance of a host device. For example, two host devices of the same weight but different volumes will result in different buoyancies, which for example may affect the power required to move the respective host devices at a similar speed.

A host device characteristic may be one or more material characteristic(s) such as type of material, a density of material of which the host device is composed. A host device may comprise one or more materials. A material characteristic may be, for example, a material of which the host device is comprised, e.g. polyurethane and/or polystyrene foam, or a property of the host device material. As polystyrene may be denser than polyurethane, it may have less buoyancy and require more power from the driveline to move the powered watercraft at the same speed. The host device may further comprise a shell, and a material characteristic may be a shell material or a property of the shell material, for example, a high impact polymer such as ABS, and/or resin.

According to some embodiments, the at least one host device characteristic comprises an individual identifier.

In some embodiments, a host device characteristic may be an individual identifier, such as a serial number. While some host device characteristics are based on the host device itself as described above, at other times, an individual identifier may be useful for identifying host devices intended for a particular context. For example, where the host device is a rental device, a serial number can be recognized by the control unit as corresponding to a rental unit, and the driveline parameters adjusted accordingly, e.g. a lower maximum motor rpm, or enabling a particular feature.

In some embodiments, the obtained at least one corresponding host device characteristic based on the host device identifier enables determination of an individual identifier of the watercraft. In some embodiments the determination of the individual identifier allows the specific host device to be recognized by the control unit. In some examples, in case the host device is a stolen device, the control unit may determine that the host device in which the driveline is inserted is a stolen device. Thereby, the individual identifier may be used as an anti-theft tool allowing blocking use of such host devices e.g. hulls that have been registered as stolen from being used with the drive module. In some embodiments, the host device may be recognized by the control unit in case the host device lacks a proper individual identifier. Thereby, the individual identifier may be used as an anti-piracy tool allowing blocking use of such host devices e.g. hulls that lack proper individual identifiers from being used with the drive module. Thus, the control unit may block usage of host devices having no individual identifiers. According to some embodiments, the powered watercraft comprises an add-on device, the add-on device comprising at least one add-on identifier device, wherein the identifying device is configured to read the at least one add-on identifier device to obtain an add-on device identifier of the add-on device, and wherein the control unit is configured to receive the add-on device identifier from the identifying device, to obtain at least one corresponding add-on device characteristic based on the add-on identifier, and to adjust the at least one driveline parameter based on the at least one corresponding add-on device characteristic.

The powered watercraft may further comprise add-on devices, such as fins, paddles, controllers, and/or foot straps. In some embodiments add-on devices may affect the performance of the watercraft, and may be accounted for in adjusting the driveline parameters. In some embodiments, such adjustment allows for better optimization of the performance of the powered watercraft and more flexibility in how the host device is used. Further, the add-on devices may allow certain features to be enabled by their corresponding driveline features.

For example, where the powered watercraft is a jetboard, an add-on device may be a fin, which can be used to help stabilize and control the jetboard. The specific characteristics of the fin, such as model, surface, area, shape, angles, depth, base dimensions, rake, and/or foil features, may affect the performance of the jetboard and the performance may be optimized by adjusting the driveline parameters.

As an example, an add on device may be a controller, a feature such as WiFi may be enabled, since there is now a device capable of receiving the WiFi signal.

According to some embodiments, the at least one driveline parameter is one or more of the following: allocated battery capacity, maximum motor current, maximum motor speed, maximum motor rpm, a throttle curve, a kill switch parameter, a system response parameter, a GPS enablement parameter, and/or a wireless signal enablement parameter. In some embodiments, the driveline parameters include propulsion module attributes, including motor speed, motor rpm, etc.

In some embodiments, the control unit communicates with an external device, such as with an external communication device, such as with an external device with a display, such as with an external communication device with a display, such as with a smart phone.

In some embodiments, the at least one host device characteristic is displayed on a display of the external device, such as of the external communication device. Thereby, the at least one host device characteristic may be automatically displayed on the external communication device e.g. on the user's smartphone. For instance, the watercraft type, the shape characteristic, the size characteristic, the material characteristic, and the individual identifier may be displayed on the smartphone of the user, such as automatically displayed, such as displayed via an app, etc. In some examples, a hull of the correct model, size, shape, color and other visual characteristics of the host device may be automatically displayed on the smartphone of the user e.g. in an app or other user Interface.

In some embodiments, power parameters may be optimized for different host devices and contexts. For example, where the host device is a high performance host device, the maximum motor speed, which may be measured in rpm, may be set to a high value to allow the user to gain maximum performance from the board. Conversely, where the host device is an all-round host device, the maximum motor rpm may be set at a lower value. In another example, where the host device is intended for long distances, allocated battery capacity may be set at a low value so as to increase the distance that may be travelled on a single charge. The parameters described above provide different methods by which the power to the propulsion module may be controlled to achieve these optimizations for the host device.

In an embodiment, a driveline parameter may be a throttle curve. The propulsion module may comprise a throttle, where the throttle affects the thrust of the jet. The throttle curve is a driveline parameter where an attribute of the propulsion module such as the motor speed is adjusted in response to a change in a throttle setting of the throttle. In some examples, throttle may be received by the control unit from an associate device, such as a remote control unit, such as a remote throttle unit, such as an external communication device. The throttle setting may be changed from a first setting to a second setting and/or from a second setting to a first setting. The motor speed may be adjusted in different ways in response to the change in throttle setting, for example, to change in a linear, stepwise, or exponential manner. The throttle may be returned to a different setting, allowing variations between time and settings. Further, the throttle curve may be combined with other driveline parameters such a maximum speed. The adjustments to the throttle curve may result in the powered watercraft accelerating in different ways, where the acceleration of the powered watercraft may be optimized based on the host device.

In some embodiments, host device characteristics may impact the performance of the powered watercraft, it is therefore an advantage to adjust the throttle curve according to the host device, e.g. slower acceleration for an all-round jetboard, of faster acceleration for a high-performance jetboard.

In some embodiments, the at least one driveline parameter may be a feature parameter, where a feature of the driveline may be enabled or disabled by the parameter setting. Such features include a kill switch, a system response, GPS, and/or WiFi. A system response may be a series of steps in the control unit in response to one or more triggering conditions. A dead man's switch may be configured to immediately shut down power to the propulsion module given a triggering condition. In some embodiments, the triggering condition may be that the user has fallen overboard.

In embodiments where the at least one driveline parameter is a feature parameter, the feature may enabled or disabled based on the host device. Certain features may only be used with a particular host device and/or add-on device. For example, a GPS feature in the driveline may be useful in the presence of a device that uses GPS data.

According to some embodiments, the at least one host identifier device and/or the at least one add-on identifier device is a wireless communication tag, and the identifying device of the driveline is a wireless communication reader. In some embodiments, the identifier device is a passive device, such as a device without a separate power supply. In some embodiments, the wireless communication reader may supply power to the identifier device when identifying the identifier.

According to some embodiments, the at least one host identifier device and/or the at least one add-on identifier device is an RFID tag, and the identifying device of the driveline is an RFID reader.

According to some embodiments, the at least one host identifier device and/or the at least one add-on identifier device is an NFC tag, and the identifying device of the driveline is an NFC reader.

In some embodiments, the identifier device of the host device and/or add-on device may be a wireless communication tag, such as an RFID tag, e.g. an NFC tag. In such cases, the identifying device would be an RFID reader or NFC reader. RFID tags and NFC tags are passive and do not require power, allowing them to be embedded into a host or add-on device without a power source. They may be configured to contain the host identifier described above.

According to some embodiments, the at least one host identifier device and/or the at least one add-on identifier device is a mechanical identifier device, and the identifying device of the driveline is a mechanical identifying device.

In some embodiments, the identifier device may be mechanical, such as including pins, magnets, and/or galvanic devices. The identifying device would then be a device configured to read such identifier device. For example, where the identifier device includes a pin, the pin may engage with a particular setting in the identifying device to communicate the host identifier to the control unit. In some embodiments, a pin may be read by a tumbler system configured to convey the host identifier from the pins to the control unit. Where the identifier device is at least one location for one or more magnets, the identifier device may be read by one or more magnetic sensors detecting the presence or absence of the magnets, and configured to convey the host identifier to the control unit. A mechanical identifier device and mechanical identifying device may also be used to obtain the host identifier.

In an embodiment, the mechanical identifier device may comprise locations for magnets located in the host device and the mechanical identifying device may comprise magnetic sensors located in the driveline. The mechanical identifying device may be configured to detect the presence or absence of a corresponding magnet, and configured to communicate with the control unit. The presence or absence of magnets and combinations thereof may provide an identifier for the host device.

According to some embodiments, the at least one driveline parameter is further adjusted based on an input from an external communication device.

In some embodiments, input from an external communication device, such as a smartphone or a controller may be used to further adjust the driveline parameters. These inputs allow decisions from the user to affect the performance of the powered watercraft, while still automatically adjusting the driveline parameters for the host device. For example, a user selecting a maximum speed may do so through a software application on their smartphone, and the driveline parameters would be adjusted based on both the host device and the input from the external communication device.

According to a second aspect there is provided a method for adjusting a powered watercraft, the powered watercraft comprising a host device, the host device comprising at least one host identifier device, a driveline comprising a propulsion module and a battery module, the battery module being configured to power the propulsion module. The driveline comprising an identifying device and a control unit, the control unit being configured to adjust at least one driveline parameter. The driveline is configured to be received in the host device. The method comprising: reading, by the identifying device, the at least one host identifier device to obtain a host identifier of the host device; receiving, in the control unit, the host identifier from the identifying device; obtaining, in the control unit, at least one corresponding host device characteristic based on the host identifier; and adjusting the at least one driveline parameter based on the at least one corresponding host device characteristic.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1a shows an embodiment wherein the control unit 114 and the identifier device 112 are located in the battery module 110;

FIG. 1b shows an embodiment wherein the control unit 114 and the identifier device 112 are located in the propulsion module 108;

FIG. 1c shows an embodiment wherein the control unit 114 is located in the battery module 110 and the identifier device 112 are located in the propulsion module 108;

Figure 3A:
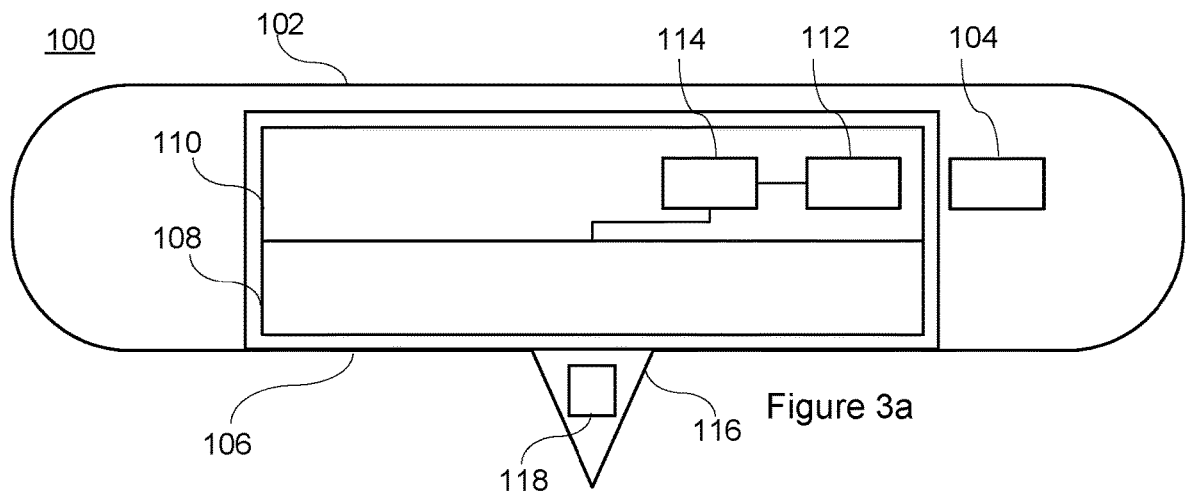
FIG. 3a shows an embodiment of a powered watercraft 100 with an add-on device 116.
Figure 3B:
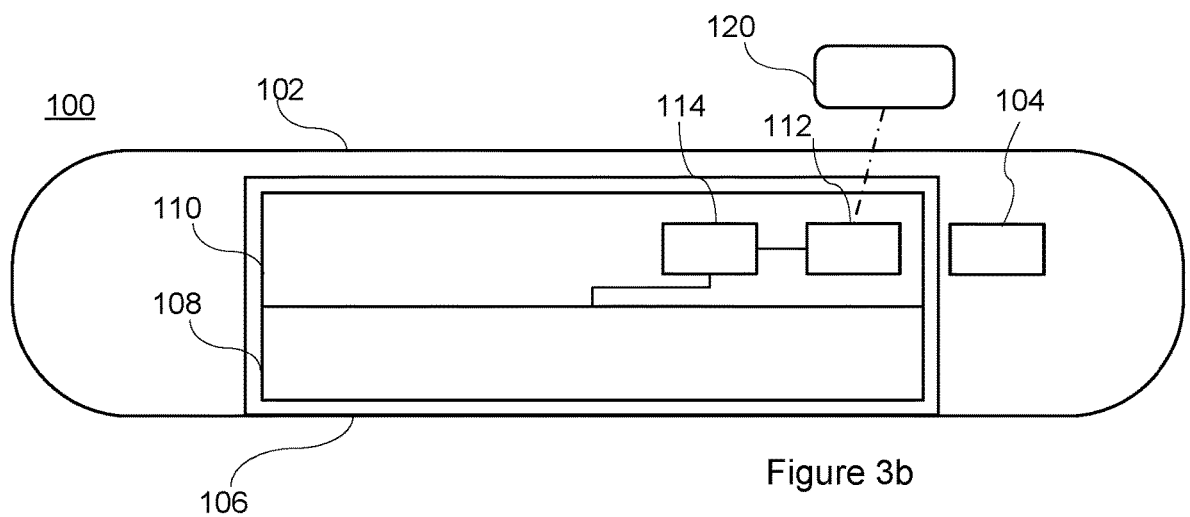
FIG. 3b shows an embodiment of a powered watercraft 100 with an external communication device 120.
Figure 3C:
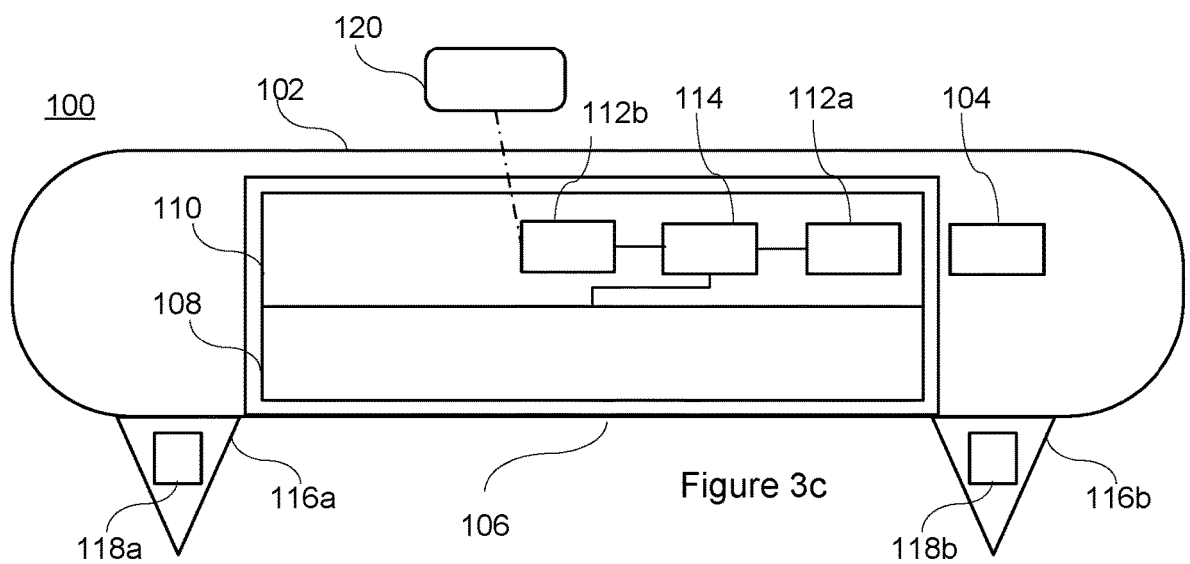
Figure 6A:
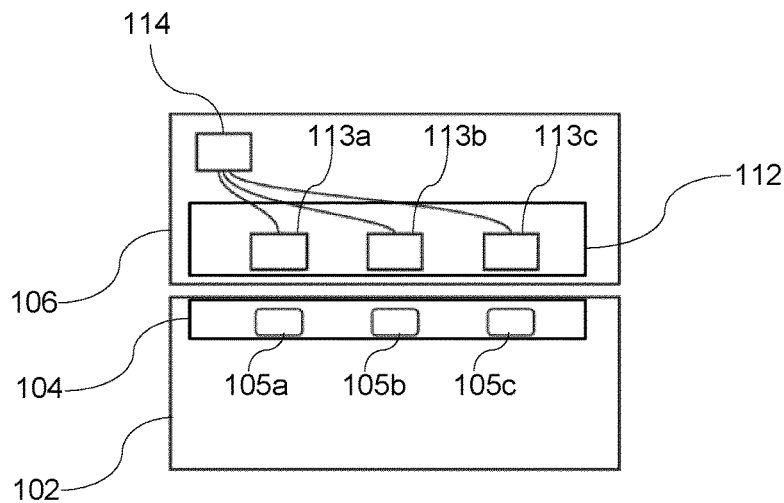
Figure 6B:
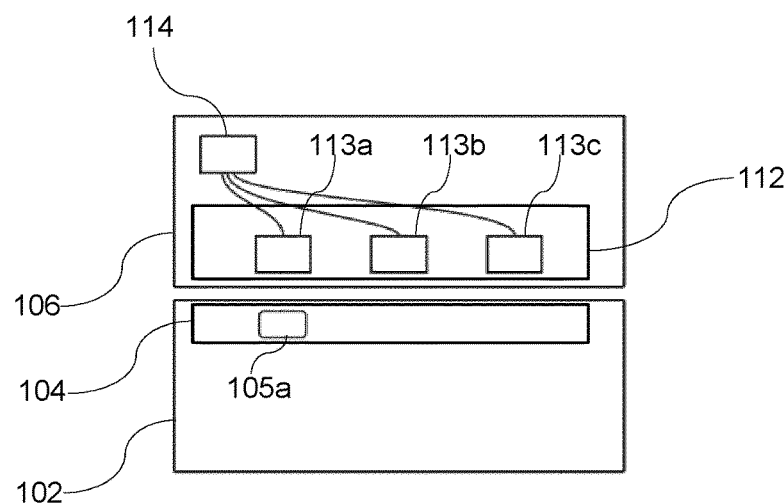

FIG. 3c shows an embodiment of a powered watercraft 100 with an add-on devices 116a and 116b, external communication device 120;

FIG. 4 show embodiments of add-on devices, fins 400, 420, 440, and 460;

FIG. 5a shows an embodiment where the throttle curve 500 has an eased acceleration response and an immediate stop response;

FIG. 5b shows an embodiment where the throttle curve 520 has a slow linear acceleration response and a slow linear stop response, with a maximum motor rpm;

FIG. 5c shows an embodiment where the throttle curve 540 has a very fast linear acceleration response and a slow linear stop response;

FIG. 6a shows an embodiment where the mechanical identifier device 104 comprises magnets 105a-c, where the magnetic sensors 113a-c are configured to detect the presence of magnets 105a-c;

FIG. 6b shows an embodiment where the mechanical identifier device 104 comprises magnet 105a, where the magnetic sensors 113a-c are configured to detect the presence of magnets 105a and the absence of other magnets;

FIG. 6a shows an embodiment where the mechanical identifier device 104 comprises magnet 105a and 105c, where the magnetic sensors 113a-c are configured to detect the presence of magnets 105a and 105c and the absence of other magnets; and FIG. 7 shows a method for adjusting a powered watercraft.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
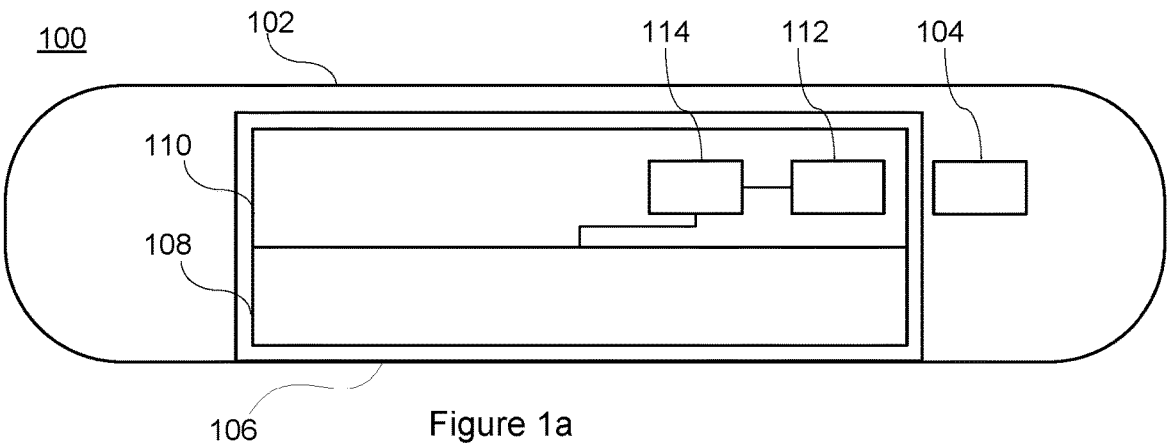
Figure 1B:
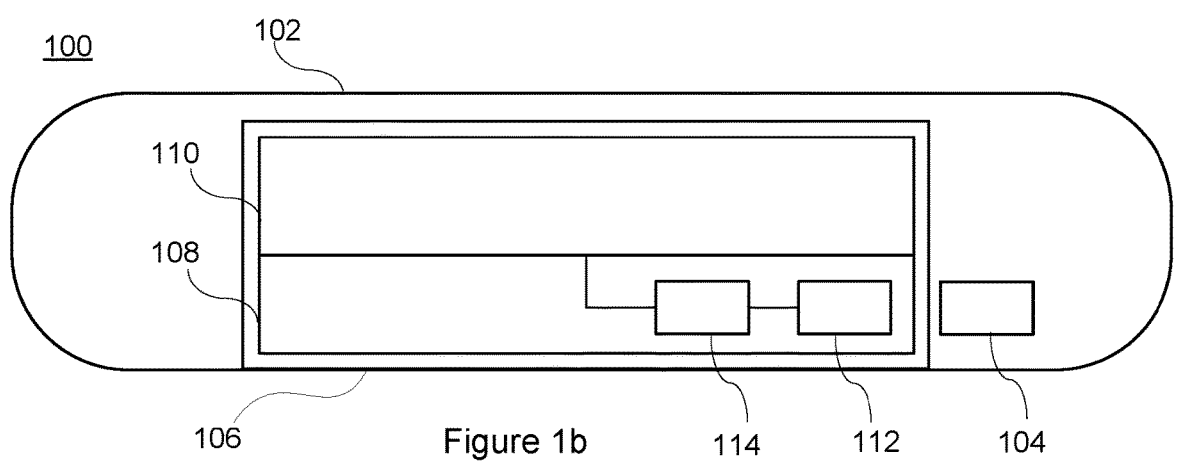
Figure 1C:
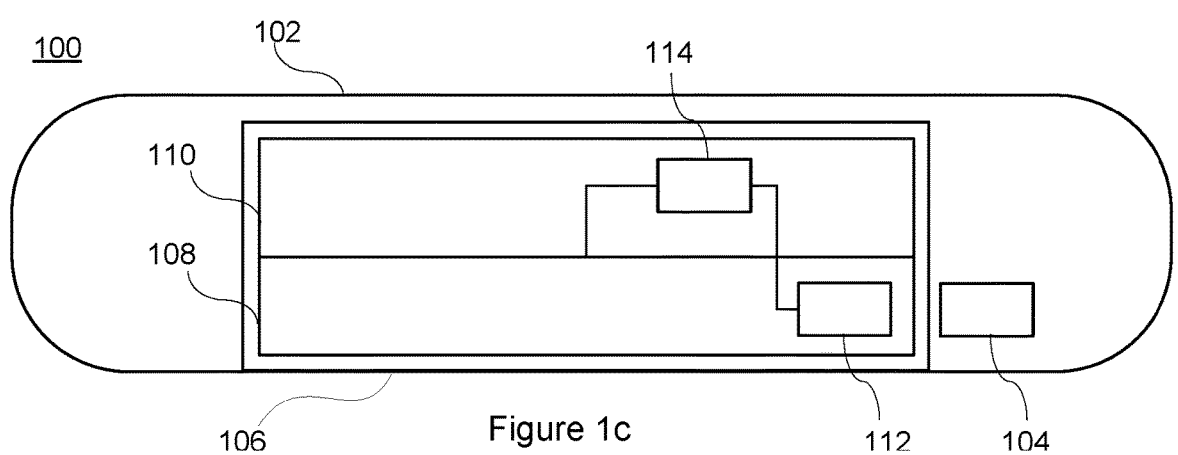

FIGS. 1a-c shows embodiments of a powered watercraft comprising a host device and a driveline.

A powered watercraft 100 comprises a host device 102, where the host device comprising at least one host identifier device 104, and a driveline 106 comprising a propulsion module 108 and a battery module 110, the battery module being configured to power the propulsion module. The driveline 106 comprises an identifying device 112 and a control unit 114, the control unit being configured to adjust at least one driveline parameter, wherein the driveline 106 is configured to be received in the host device 102, wherein the identifying device 112 is configured to read the at least one host identifier device 104 to obtain at least one host identifier of the host device 102, wherein the control unit 114 is configured to receive the at least one host device identifier from the identifying device 112, to obtain at least one corresponding host device characteristic based on the host device identifier; and to adjust the at least one driveline parameter based on the at least one corresponding host device characteristic.

A host identifier device 104 and an identifying device 112 may be, for example: a wireless communication tag and a wireless communication reader, e.g. an RFID tag and an RFID reader, an NFC tag and an NFC reader; a mechanical identifier device and a mechanical identifying device, e.g. a location for one or more magnets and one or more corresponding magnet sensors, a pin set and a corresponding tumbler with sensors.

FIG. 1a shows an embodiment wherein the control unit 114 and the identifier device 112 are located in the battery module 110. FIG. 1b shows an embodiment wherein the control unit 114 and the identifier device 112 are located in the propulsion module 108. FIG. 1c shows an embodiment wherein the control unit 114 is located in the battery module 110 and the identifier device 112 are located in the propulsion module 108.

Figure 2A:
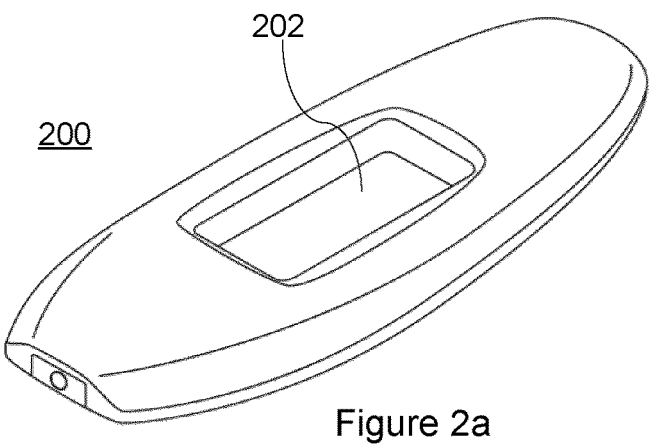
FIG. 2a is an illustration of an embodiment of a host device 200 for housing a driveline for a powered watercraft 100.
Figure 2B:
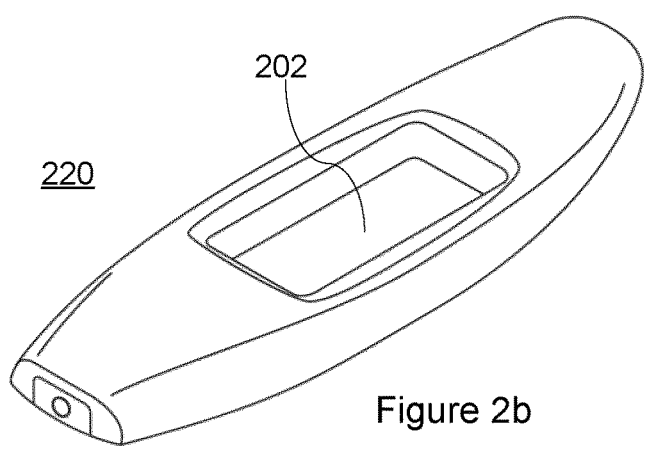
FIG. 2b is an illustration of an embodiment of a host device 220 for housing a driveline for a powered watercraft 100.
Figure 2C:
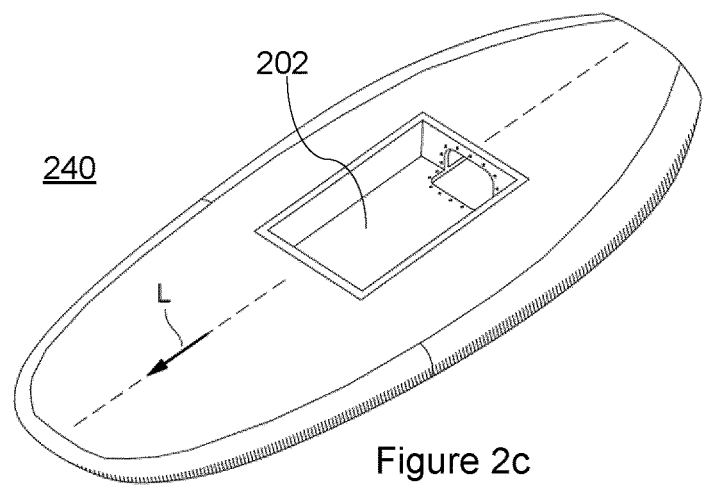
FIG. 2c is an illustration of an embodiment of a host device 240 for housing a driveline for a powered watercraft 100.

FIGS. 2a-c shows examples of different host devices, with different host device characteristics. The host device is a flotation device configured to receive a removable driveline. The host device may be hull or a main body, such as a substantially rigid main body, for a powered watercraft, such as a jetboard. The host device may be understood as a structural part of a watercraft providing an amount of buoyancy, and preferably a load-bearing capacity, for carrying a user.

FIG. 2a is an illustration of an embodiment of a host device 200 for housing a driveline for a powered watercraft 100. A cavity 202 provides an interior volume of space within said host device 200 for housing a removable driveline. Host device 200 may be a host device characteristics where the watercraft type is a jetboard, where a shape characteristic may be a relatively flat-bottomed hull, size characteristics may include having a length of 180 cm to 220 cm and a weight of 12-18 kg, and where material characteristic include is that the shell of the jetboard may be at least partly made of a high impact polymer such as ABS and the core of the jetboard may be a polyurethane foam. In this embodiment, the host device characteristics result in a more buoyant, but less agile board. Performance may be enhanced by adjusting the driveline parameters accordingly.

A host device characteristic may also be an individual identifier, for example a serial number.

FIG. 2b is an illustration of an embodiment of a host device 220 for housing a driveline for a powered watercraft 100. A cavity 202 provides an interior volume of space within said host device 220 for housing a removable driveline. Host device 220 has host device characteristics where the watercraft type is a jetboard, where a shape characteristic may be a curved hull, size characteristics may include having a length of 160 to 190 cm and a weight of 7-12 kg, and where material characteristic include is that the shell of the jetboard may be at least partly made of a resin shell and the core of the jetboard may be a polystyrene foam. In this embodiment, the host device characteristics result in a less buoyant, but more agile board. Performance may be enhanced by adjusting the driveline parameters accordingly.

FIG. 2c is an illustration of an embodiment of a host device 240 for housing a driveline for a powered watercraft 100. The powered watercraft 100 may be a water-jet propelled surfboard, and the housing device 240 may be a hull or substantially rigid main body of a jetboard. A cavity 242 provides an interior volume of space within said host device 240 for housing a removable driveline.

FIGS. 3a-c show embodiments of the powered watercraft with add-on devices 116, 116a, 116b and/or external communication device 120. The powered watercraft may further comprise one or more add-on devices, the add-on device comprising at least one add-on identifier device 118, wherein the identifying device is configured to read the at least one add-on identifier device to obtain an add-on device identifier of the add-on device, and wherein the control unit is configured to receive the add-on device identifier from the identifying device, to obtain at least one corresponding add-on device characteristic based on the add-on identifier, and to adjust the at least one driveline parameter based on the at least one corresponding add-on device characteristic.

The powered watercraft may further comprise add-on devices, such as fins, paddles, controllers, and/or foot straps. As these add-on devices may affect the performance of the watercraft, they should be accounted for in adjusting the driveline parameters. Allowing this adjustment allows for better optimization of the performance of the powered watercraft and more flexibility in how the host device is used. Further, the add-on devices may allow certain features to be enabled by their corresponding driveline features.

The add-on device may have an add-on identifier device such that the identifying unit 112 can receive an add-on identifier to send to the control unit. The add-on identifier should correspond to the identifying device, and may be, for example: a wireless communication tag such as an RFID tag and/or NFC tag; a mechanical identifier device such as pins, locations for one or more magnets.

FIG. 3a shows an embodiment of a powered watercraft 100 with an add-on device 116. Add-on device 116 may be a fin, and further comprises an add-on identifier 118, configured to be read by identifying device 112.

FIG. 3b shows an embodiment of a powered watercraft 100 with an external communication device 120. External communication device 120 may be, for example, a smartphone or a remote control device, and may be configured to be read by identifying device 112.

FIG. 3c shows an embodiment of a powered watercraft 100 with an add-on devices 116a and 116b, external communication device 120, and identifying devices 112a and 112b. Add-on devices 116a and 116b may be fins, and each further comprises add-on identifiers 118a and 118b respectively. The add-on identifiers 118a and 118b may be configured to be read by identifying device 112a. External communication device 120 may be, for example, a smartphone or a remote control device, and may be configured to be read by identifying device 112b.

FIG. 4 show embodiments of add-on devices, fins 400, 420, 440, and 460. The fins may vary based on different characteristics such as model, surface, area, shape, angles, depth, base dimensions, rake, and/or foil features. The characteristics of the add-on devices affect the performance of the powered watercraft, and the driveline parameters should be adjusted accordingly.

Fin 400 may be a long fin with a high degree of rake, protruding into the water vertically and horizontally more than fins 420 and 440, improving stability and control. Fin 420 is shorter and has a lower degree of rake than Fin 400, protruding into the water less but still providing stability. Fin 440 is a shorter fin with a wide base and a low degree of rake, and does not protrude into the water and away from the powered watercraft as much as fin 400. Shorter fins and lower degrees of rake allow a sharper turning radius, and therefore, more agility, but provide less stability. Fin 460 is a longer fin with a lower degree of rake.

FIGS. 5a-c show different embodiments of a driveline parameter, the throttle curve. The propulsion module may comprise a throttle, where the throttle affects the thrust of the jet. The throttle curve is a driveline parameter where an attribute of the propulsion module such as the motor speed is adjusted in response to a change in a throttle setting of the throttle, which may be, for example, received by the control unit from an add-on device such as a remote throttle unit or an external communication device such as a remote control unit. The throttle setting may be changed from a first setting to a second setting and/or from a second setting to a first setting. The motor speed may be adjusted in different ways in response to the change in throttle setting, for example, to change in a linear, stepwise, or exponential manner. The throttle may be returned to a different setting, allowing variations between time and settings. Further, the throttle curve may be combined with other driveline parameters such a maximum speed. The adjustments to the throttle curve may result in the powered watercraft accelerating in different ways, where the acceleration of the powered watercraft may be optimized based on the host device.

As host device characteristics can impact the performance of the powered watercraft, the throttle curve should be adjusted in according to the host device, e.g. slower acceleration for a larger powered watercraft, of faster acceleration for a high-performance powered watercraft.

In the embodiments of throttle curves shown, time 504 is shown on the x-axis and throttle setting or motor speed 502 is shown on the y-axis. Throttle over time 506 shows the throttle setting over time, and motor speed over time 508 shows the motor rpm over time.

FIG. 5a shows an embodiment where the throttle curve 500 has an eased acceleration response and an immediate stop response. When the throttle over time 506 changes from a first setting to a second setting, where the second setting is higher than the first, the motor speed over time 508 increases progressively more, and the powered watercraft has an eased linear acceleration response. When throttle curve 508 changes from the second setting to the first, the motor speed over time 508 drops suddenly as well, and the powered watercraft has an immediate stop response, coming to an immediate stop because of the setting of throttle curve.

FIG. 5b shows an embodiment where the throttle curve 520 has a slow linear acceleration response and a slow linear stop response, with a maximum motor rpm. When the throttle over time 506 changes from a first setting to a second setting, the motor speed over time 508 increases at a steady rate, in a slow linear acceleration response. Because a maximum motor rpm has been set, the motor speed over time 508 here plateaus at a lower motor rpm than in throttle curve 500. When the throttle over time 506 changes from the second setting to the first, the motor speed over time 508 decreases steadily but gradually, in a slow linear stop response, resulting in a gradual stop to the powered watercraft. These settings may be more appropriate where the host is a larger jetboard designed for beginners.

FIG. 5c shows an embodiment where the throttle curve 540 has a very fast linear acceleration response and a slow linear stop response. When the throttle over time 506 changes from a first setting to a second setting, the motor speed over time 508 increases at a high but steady rate, in a very fast linear acceleration response. When the throttle over time 506 changes from the second setting to the first, the motor speed over time 508 decreases steadily but gradually, in a slow linear stop response, resulting in a gradual stop to the powered watercraft. These settings may be appropriate for a high performance powered watercraft, where fast acceleration is desired.

Figure 6C:
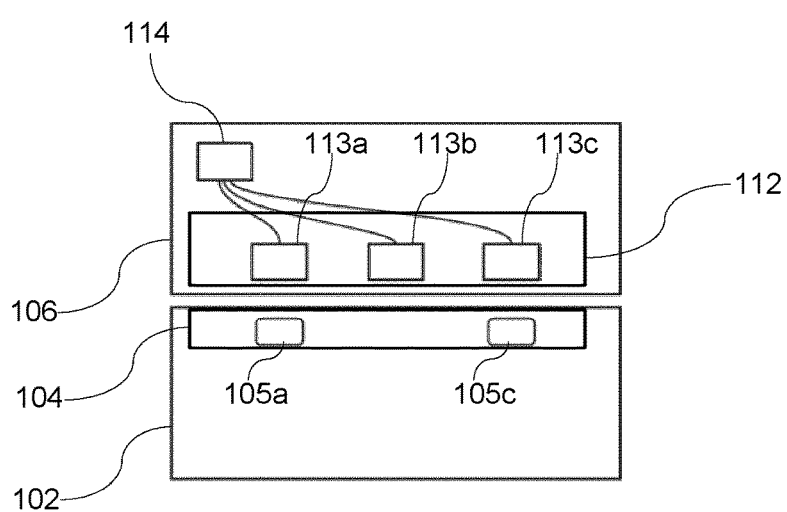

FIGS. 6a-c shows an embodiment of a mechanical identifier device 104 and a mechanical identifying device 112, wherein the mechanical identifier device comprises locations for magnets 105a-c located in the host device 102 and the mechanical identifying device 104 comprises magnetic sensors 113a-c located in the driveline, configured detect the presence or absence of a corresponding magnet, and configured to communicate with control unit 114. The presence or absence of magnets and combinations thereof may be an identifier for the host device 102.

FIG. 6a shows an embodiment where the mechanical identifier device 104 comprises magnets 105a-c, where the magnetic sensors 113a-c are configured to detect the presence of magnets 105a-c.

FIG. 6b shows an embodiment where the mechanical identifier device 104 comprises magnet 105a, where the magnetic sensors 113a-c are configured to detect the presence of magnets 105a and the absence of other magnets.

FIG. 6a shows an embodiment where the mechanical identifier device 104 comprises magnet 105a and 105c, where the magnetic sensors 113a-c are configured to detect the presence of magnets 105a and 105c and the absence of other magnets.

FIG. 7 shows a method for adjusting a powered watercraft. The powered watercraft comprises a host device, the host device comprising at least one host identifier device, and a driveline comprising a propulsion module and a battery module, the battery module being configured to power the propulsion module. The driveline comprising an identifying device and a control unit, the control unit being configured to adjust at least one driveline parameter, wherein the driveline is configured to be received in the host device. The method 700 for adjusting a powered watercraft comprises:

Reading 702, by the identifying device, the at least one host identifier device to obtain a host identifier of the host device;

Receiving 704, in the control unit, the host identifier from the identifying device;

Obtaining 706, in the control unit, at least one corresponding host device characteristic based on the host identifier; and Adjusting 708 the at least one driveline parameter based on the at least one corresponding host device characteristic.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A powered watercraft comprising:
   a host device having at least one host identifier device;
   a driveline having a propulsion module and a battery module, the battery module being configured to power the propulsion module;
   the driveline having an identifying device and a control unit, the control unit being configured to adjust at least one driveline parameter;
   wherein the driveline is configured to be received in the host device;
   wherein the identifying device is configured to read the at least one host identifier device to obtain at least one host device identifier of the host device;
   wherein the control unit is configured to receive the at least one host device identifier from the identifying device, to obtain at least one host device characteristic based on the host device identifier, and to adjust the at least one driveline parameter based on the at least one host device characteristic.

2. The powered watercraft according to claim 1, where the at least one host device characteristic comprises one or more of the following: a watercraft type, a shape characteristic, a size characteristic, and/or a material characteristic.

3. The powered watercraft according to claim 1, where the at least one host device characteristic comprises an individual identifier.

4. The powered watercraft according to claim 1, wherein the at least one host device characteristic is displayed on an external communication device.

5. The powered watercraft according to claim 1, further comprising:
   an add-on device having at least one add-on identifier device;
   wherein the identifying device is configured to read the at least one add-on identifier device to obtain an add-on device identifier of the add-on device; and
   wherein the control unit is configured to receive the add-on device identifier from the identifying device, to obtain at least one add-on device characteristic based on the add-on device identifier, and to adjust the at least one driveline parameter based on the at least one add-on device characteristic.

6. The powered watercraft according to claim 1, wherein the at least one driveline parameter is one or more of the following: allocated battery capacity, maximum motor current, maximum motor rpm, a throttle curve, a kill switch parameter, a system response parameter, a GPS enablement parameter, and/or a wireless signal enablement parameter.

7. The powered watercraft according to claim 5, wherein the at least one host identifier device and/or the at least one add-on identifier device is a wireless communication tag, and the identifying device of the driveline is a wireless communication reader.

8. The powered watercraft according to claim 5, wherein the at least one host identifier device and/or the at least one add-on identifier device is an RFID tag, and the identifying device of the driveline is an RFID reader.

9. The powered watercraft according to claim 5, wherein the at least one host identifier device and/or the at least one add-on identifier device is an NFC tag, and the identifying device of the driveline is an NFC reader.

10. The powered watercraft according to claim 5, wherein the at least one host identifier device and/or the at least one add-on identifier device is a mechanical identifier device, and the identifying device of the driveline is a mechanical identifying device.

11. The powered watercraft according to claim 4, wherein the at least one driveline parameter is further adjusted based on an input from the external communication device.

12. A method for adjusting a powered watercraft, the powered watercraft (100) comprising a host device having at least one host identifier device, a driveline having a propulsion module and a battery module, the battery module being configured to power the propulsion module, the driveline having an identifying device and a control unit configured to adjust at least one driveline parameter, the driveline being configured to be received in the host device, the method comprising:
   reading, by the identifying device, the at least one host identifier device to obtain a host device identifier of the host device;
   receiving, in the control unit, the host device identifier from the identifying device;
   obtaining, in the control unit, at least one host device characteristic based on the host device identifier; and
   adjusting the at least one driveline parameter based on the at least one host device characteristic.

* * * * *